Figure 1:
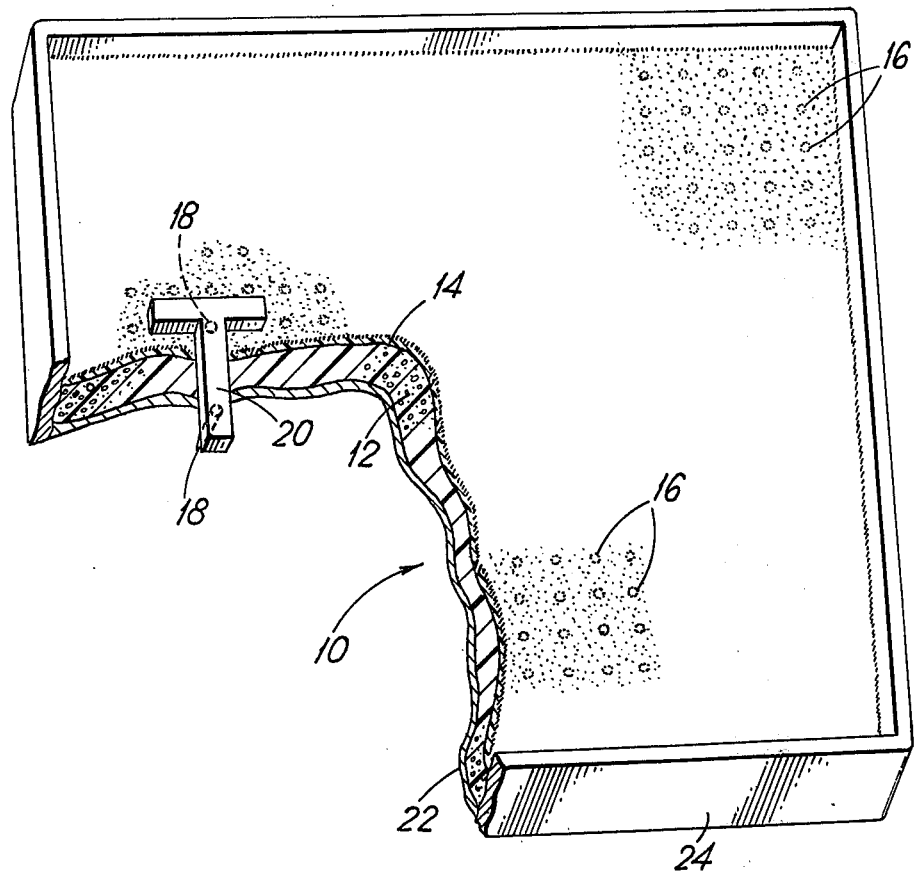

United States Patent [19]

Chamberlain

[11] 4,005,539
[45] Feb. 1, 1977

[54] PEG BOARDS

[75] Inventor: George H. N. Chamberlain, Great Yeldham, England

[73] Assignee: Signco Limited, Bury, England

[22] Filed: Mar. 27, 1975

[21] Appl. No.: 562,634

[30] Foreign Application Priority Data

Apr. 4, 1974 United Kingdom .................. 15021

[52] U.S. Cl. .............................. 40/143; 40/125 F; 428/78; 428/90; 428/137; 428/310
[51] Int. Cl.² ...................... G09F 7/06; B32B 3/26
[58] Field of Search ............ 428/90, 99, 101, 131, 428/137, 138, 223, 310, 315, 542, 77, 78, 79; 40/125 F, 140, 142 R, 143; D6/114, 157, 188

[56] References Cited
UNITED STATES PATENTS

| | | | |
|---|---|---|---|
| 2,149,363 | 3/1939 | Rivkin | 40/28 |
| 3,126,978 | 3/1964 | Bergstrom | 428/315 |
| 3,920,872 | 11/1975 | Ollinger | 428/138 |

*Primary Examiner*—William J. Van Balen
*Attorney, Agent, or Firm*—Kane, Dalsimer, Kane, Sullivan and Kurucz

[57] ABSTRACT

A peg-board comprising a body secured to a sheet of a resiliently deformable material, the sheet having a flock-like finish and being formed with a plurality of similar apertures therethrough, and the apertures being arranged as a regular lattice of intersecting rows and columns, whereby an elongate pin formed on a character, and having a lateral dimension greater than the largest lateral dimension of an aperture, can be pushed through one of said apertures and be firmly gripped by a resilient deformation of at least the sheet.

9 Claims, 2 Drawing Figures

PEG BOARDS

The present invention relates to peg-boards, by which we mean a board capable of co-operation with pegs (more commonly referred to as pins) formed on alphanumeric or other characters to allow desired ones of those characters to be mounted securely in selected positions on the board for display purposes.

According to the present invention, a peg-board comprises a body secured to a sheet of a resiliently deformable material which has a flock-like finish and is formed with a plurality of similar apertures therethrough, the apertures being arranged as a regular lattice of intersecting rows and columns, and the arrangement being such that an elongate pin formed on an alphanumeric or other character, and having a lateral dimension greater than the largest lateral dimension of an aperture, can be pushed through one of said apertures and be firmly gripped by a resilient deformation of at least the sheet.

The flock-like finish disguises the presence of sharp edges outlining the mouths of the apertures, and provides a background to the characters of uniform appearance, which we regard as aesthetically pleasing. Moreover, because a pin formed on a character is gripped primarily, if not entirely, by a resilient deformation of the sheet, it has been found that the body can be formed of any material which can support the sheet against flexing away from a character being applied thereto.

To allow insertion of the pins, the body can be formed with its own apertures, which may for example be blind, and which are located in alignment with the apertures through the sheet. Preferably, however, the body is formed of a cellular polymeric material, such as expanded polystyrene, into which the pins can be readily pressed. Clearly, the first time that a pin is pressed into expanded polystyrene to form a blind hole, frictional forces will be set up which are frequently sufficiently great to preclude accidental separation. However, in spite of the self re-sealing properties of expanded polystyrene, it has been found that with repeated use the blind hole progressively loses its ability to grip firmly a pin inserted therein.

Preferably, the sheet is formed of a plastics material, one face having a flock-like finish obtained by a peeling operation performed thereon whilst the plastics material was in a tacky state, and the other face having a backing of paper or fabric. Such a sheet is currently sold in Britain by Imperial Chemical Industries Limited under the trade name "Vivelle". We are given to understand that "Vivelle" is made by contacting, and then pulling apart, two freshly-extruded sheets of polyethylene, thereby resulting in a mass of relatively short irregular spikes (on each sheet) which matt together to give a flocked appearance. It has been found that any marks or impressions left in a sheet of "Vivelle" can be brushed out. Moreover, a sheet of "Vivelle" can be of various colours, and is preferably treated during manufacture so that its colour does not fade in sunlight. The reader should note that by the term "flock-like" we do not mean to exclude resiliently deformable materials which have actually been flocked.

Figure 2:
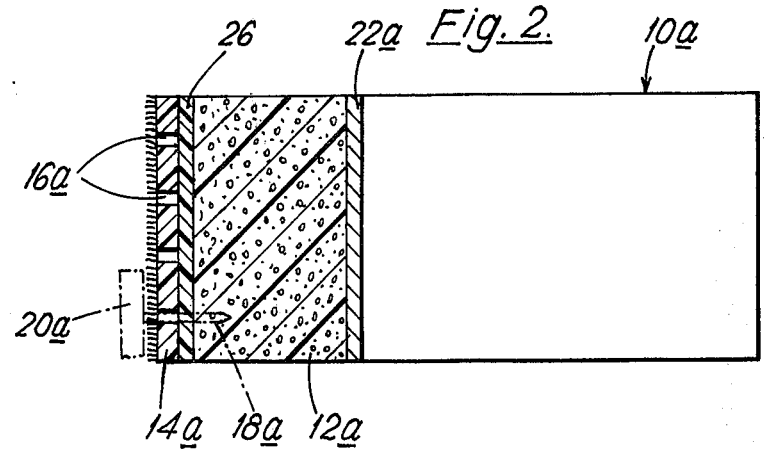

Two peg-boards according to the present invention will now be described, by way of example only, with reference to the accompanying drawings, in which:

FIG. 1 is a partially sectioned fragmentary perspective view of a first peg-board shown carrying an alphanumeric character; and, FIG. 2 is a schematic sectional view through a second peg-board.

A peg-board 10, shown in FIG. 1, comprises a body 12 of expanded polystyrene, which is a cellular polymeric material. Other examples of such a material are expanded polyethylene and foamed polyurethane. The body 12 is covered by a sheet 14 of the above-described "Vivelle", which it will be remembered is a resiliently deformable material having a flock-like finish. That material is normally sold by I.C.I. (see above) with a paper or fabric backing, which can be stuck to the body 12 of expanded polystyrene by any adhesive which dries to give a matt surface.

The sheet 14 is formed with a plurality of similar apertures 16 therethrough, the apertures being arranged as a regular lattice of intersecting rows and columns. Each of the apertures 16 is circular in lateral cross-section, adjacent apertures in each row or column being spaced apart by one-quarter inch (6.3mm). If the peg-board 10 is to be used with characters of the Arabic language, it may be more convenient to have adjacent apertures spaced apart by less than this. The apertures 16 can be formed by a perforating machine of known type before securing the sheet 14 to the body 12.

A conventional alphanumeric character 20 (shown in FIG. 1 as a capital letter T) is integrally moulded in polyethylene with two elongate pins 18 of substantially circular cross-section. The pins 18 are spaced apart by a distance which is a multiple of the distance separating adjacent ones of the apertures 16 in each row or column. Each pin 18 can be pushed through one of said apertures 16 and be firmly gripped by a resilient deformation of at least the sheet 14. It has been found that repeated insertion and withdrawal of the pins 18 do not lead to tearing or dilation of the sheet 14, nor to breaking-up of the body 12.

For protection, that face of the body 12 remote from the sheet 14 is covered by a backing 22 of, for example, plywood, hard-board or unexpanded polystyrene. Similarly, edges of the body 12 and the sheet 14 are covered by at least one protective strip 24 of, for example, anodised aluminium. A cheaper alternative is to replace the anodised aluminium by polyvinylchloride.

Referring now to FIG. 2, a second peg-board 10a according to the present invention is shown, in which component parts corresponding to those on the above-described peg-board 10 have been given similar reference numerals with the addition of the subscript $a$. Two differences of construction are that a layer 26 of extruded polystyrene is located between a body 12a and a sheet 14a, the purpose being to give a better grip to an elongate pin formed on a character and passing therethrough. The other difference is that the face of the sheet 14a remote from the body 12a is not planar, and in fact has a generally cylindrical shape. An advantage of this is that the peg-board 10a can be secured to, for example, a pillar. A protective backing 22a may not be required, but would be required if the peg-board 10a was of spherical shape. In use, an elongate pin 18a on a character 20a is pushed through an aperture 16a and be firmly gripped by a resilient deformation of at least the sheet 14a.

In particularly preferred embodiments of peg-boards according to the present invention, the apertures through the sheet are 0.066 inch (1.68mm) in diameter, which has been found to be suitable for use with elongate pins of 0.093 inch (2.36mm) diameter.

I claim:

1. A peg-board having a plurality of removable alphanumeric characters securely mounted thereto in selected positions for display purposes, the peg-board comprising; a sheet of a resiliently deformable plastics material having two faces, one face being exposed and consisting of a mass of short spikes matted together to give a flock-like finish, and the other face being secured to a body of a cellular polymeric material, a plurality of similar apertures extending through the sheet and being arranged as a regular lattice of intersecting rows and columns with the flock-like finish of the exposed face of the sheet acting to obscure the location of the apertures but not to hide their location completely, each of the removable characters being formed with at least one elongate pin which has a lateral dimension greater than the largest lateral dimension of any of the apertures, and all of the pins extending through respective selected apertures and into the body, the cellular polymeric material of which is thereby deformed to define continuations of said selected apertures, whereby all of said pins are firmly gripped by a resilient deformation of at least the sheet.

2. A peg-board according to claim 1, in which the plastics material of the sheet is polyethylene.

3. A peg-board according to claim 1, in which the polymeric material of the body is expanded polystyrene.

4. A peg-board according to claim 1, in which that face of the sheet secured to the body has a backing.

5. A peg-board according to claim 1, in which the apertures are circular in lateral cross-section.

6. A peg-board according to claim 1, in which that face of the body remote from the sheet is covered by a protective backing.

7. A peg-board according to claim 1, in which edges of the body and the sheet are covered by at least one protective strip.

8. A peg-board according to claim 1, in which that face of the sheet remote from the body is not planar.

9. A peg-board according to claim 8 which has a generally cylindrical shape.

* * * * *

UNITED STATES PATENT OFFICE
CERTIFICATE OF CORRECTION

PATENT NO. : 4,005,539
DATED : February 1, 1977
INVENTOR(S) : George H. N. Chamberlain It is certified that error appears in the above-identified patent and that said Letters Patent are hereby corrected as shown below:

Change the Title on the face of the patent from "PEG BOARDS" to --DISPLAY BOARDS--;

In the ABSTRACT, the first line change "peg-board" to --display board--;

Col. 1, change the title from "PEG BOARDS" to --DISPLAY BOARDS--;

Col. 1, line 4, change "peg-boards" to --display boards--;

Col. 1, line 10, change "peg-board" to --display board--;

Col. 1, line 66, change "peg-boards" to --display boards--;

Col. 2, line 2, change "peg-board" to --display board--;

Col. 2, line 5, change "peg-board" to --display board--;

Col. 2, line 6, change "peg-board" to --display board--;

Col. 2, line 23, change "peg-board" to --display board--;

Col. 2, line 48, change "peg-board" to --display board--;

Col. 2, line 51, change "peg-board" to --display board--;

Col. 2, line 60, change "peg-board" to --display board--;

Col. 2, line 62, change "peg-board" to --display board--;

Col. 2, line 67, change "peg-boards" to --display boards--;

Col. 3, line 5, change "peg-board" to --display board--;

UNITED STATES PATENT OFFICE
CERTIFICATE OF CORRECTION

PATENT NO. : 4,005,539
DATED : February 1, 1977
INVENTOR(S) : George H. N. Chamberlain Page 2 of 2

It is certified that error appears in the above-identified patent and that said Letters Patent are hereby corrected as shown below:

Col. 3, line 7, change "peg-board" to --display board--;

Col. 4, line 4, change "peg-board" to --display board--;

Col. 4, line 6, change "peg-board" to --display board--;

Col. 4, line 9, change "peg-board" to --display board--;

Col. 4, line 11, change "peg-board" to --display board--;

Col. 4, line 13, change "peg-board" to --display board--;

Col. 4, line 16, change "peg-board" to --display board--;

Col. 4, line 19, change "peg-board" to --display board--; and

Col. 4, line 21, change "peg-board" to --display board--.

Signed and Sealed this

Twentieth Day of March 1979

[SEAL]

Attest:

RUTH C. MASON
Attesting Officer

DONALD W. BANNER
Commissioner of Patents and Trademarks